United States Patent [19]
Kuhn et al.

[11] 3,781,776
[45] Dec. 25, 1973

[54] SOLID STATE HIGH SPEED SCANNING COMPENSATOR SWITCH FOR SONAR

[75] Inventors: Gerald D. Kuhn, Waldron; Kenneth A. Peterson; Eugene R. Roeschlein; Donald C. Weiss; Kenneth F. Weiss; David L. Zeph, all of Indianapolis, Ind.

[73] Assignee: The United States of America as represented by the Secretary of the Navy, Washington, D.C.

[22] Filed: May 22, 1972

[21] Appl. No.: 255,827

[52] U.S. Cl. .............................. 340/3 R, 340/6 R
[51] Int. Cl. .......................... G01s 9/68, G01s 3/80
[58] Field of Search ............... 340/3 R, 6 R, 16 R; 343/100 SA

[56] References Cited
UNITED STATES PATENTS
3,676,839   7/1972   Wohl et al. ..................... 340/6 R Primary Examiner—Richard A. Farley
Attorney—R. S. Sciascia et al.

[57] ABSTRACT

A solid state high speed scanning compensator switch having a clock frequency source controlling a multiplicity of semi-conductor switches in a prescribed manner to scan the outputs of hydrophones of a sonar receiver system by selecting a group of 16 adjacent outputs and to switch same into beam-forming delay lines, then steering the received beam in a rapid manner and passing the summed analog signals through a bandpass filter and at the same time providing scan synchronizing three-phase signals for producing a spiral sweep to provide sonar range and direction of a target on a display in relation to the hydrophone receivers.

8 Claims, 1 Drawing Figure

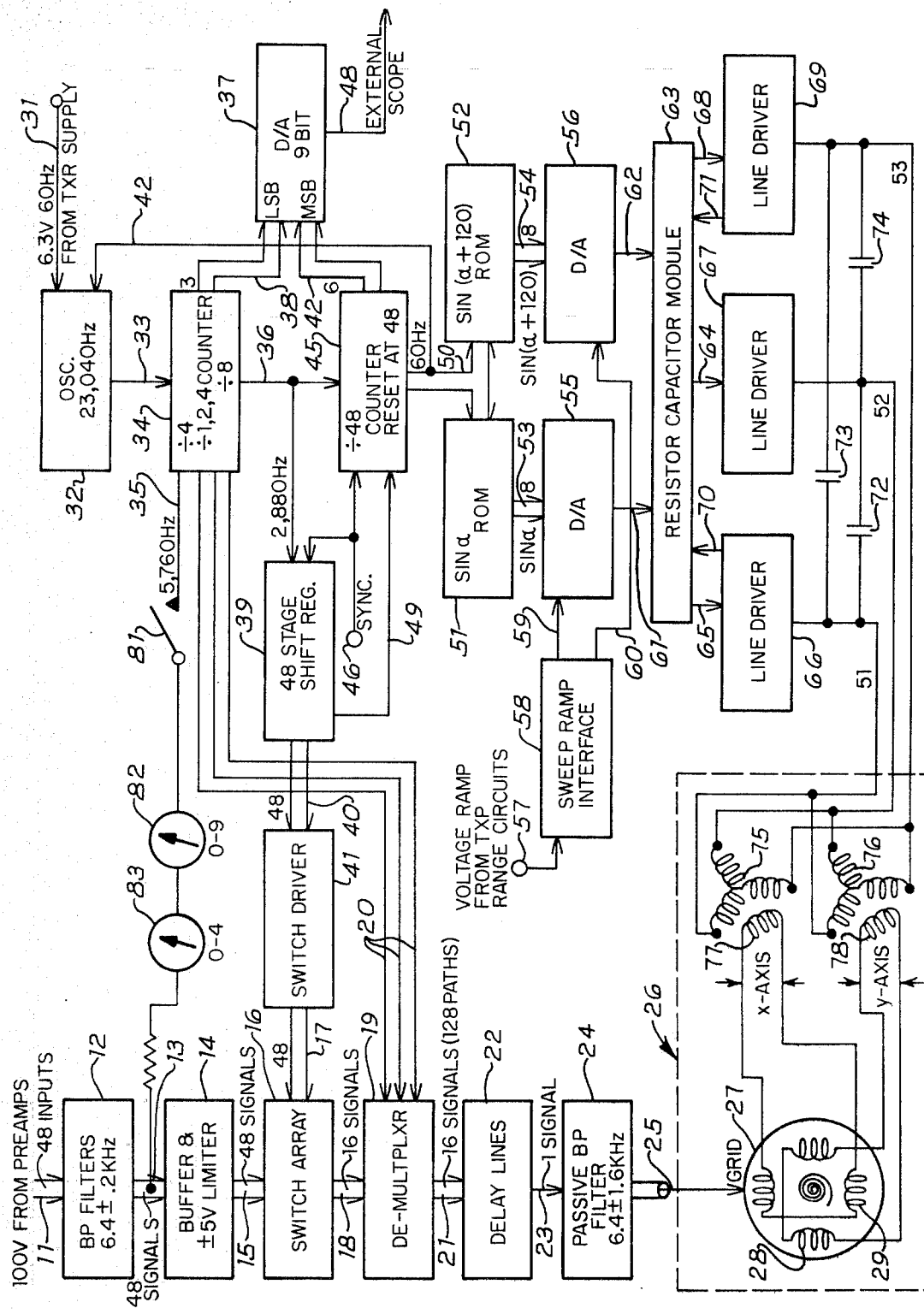

SOLID STATE HIGH SPEED SCANNING COMPENSATOR SWITCH FOR SONAR

BACKGROUND OF THE INVENTION

This invention relates to sonar receiver system target detection by activating a group of sonar hydrophones throughout 360° of scan to cover a sphere of surveillance and more particularly to provide a high speed scanning solid state switching means without any mechanical moving parts to scan a multitude of receiving hydrophone signals and direct these signals into delay lines for beam forming for display on a spiral scan formatted scope for target display of range and direction.

Older known means of accomplishing this rapid scanning utilizes a motor driven capacitively coupled switch which switches the signals into the proper points of a delay line to accomplish beamforming, and to provide the spiral scanning deflection interface with a rotating synchro whose electrical input was the input sweep ramp voltage. This mechanical switch rotates at 60 revolutions per second and is very difficult to maintain and requires frequent overhaul of replacement. The vibration and mechanical tolerances of the rotor and stator also cause noise and distortions of the output signals and the beam patterns, which limit the minimum detectable signal levels and usefulness to the operator. Additionally the rotation of the interface synchro at this high speed caused excessive brush wear in the synchro and shortened the life of this component and made frequent replacement necessary.

SUMMARY OF THE INVENTION

In the present invention a high speed solid state integrated circuit (IC) switching combination is controlled in scanning operation by digital shift registers and counters driven from a clock source such as a phase-locked oscillator. The clock source also supplies a digital counter output through read only memory (ROM) ICs and digital-to-analog converters to produce three-phase synchro signals of the required amplitude and phase to drive a spiral scope display. The same oscillator provides frequency signals that can be switched into the hydrophones input channel to effect a test of the continuity and operation of the hydrophone-to-display circuits. The present system is synchronized with the sonar transmitter system so that the start of the spiral sweep at the center of the display at the time that transmission is initiated and spirals outward as time passes. It is accordingly an object of this invention to provide a solid state switch means for switching hydrophone signals of a sonar system at high speed to a multitap delay line for beam forming of target signals coupled to a display scope to depict range and direction of a target or targets, the switching operation being under the control of precisely timed and synchronized digital signal means without the use of any mechanical moving parts.

BRIEF DESCRIPTION OF THE DRAWING

These and other objects and the attendant advantages, features and uses will become more apparent to those skilled in the art as a more detailed description proceeds when considered along with the accompanying drawing illustrating the invention in block circuit schematic with arrows designating the direction of signal information.

DESCRIPTION OF THE PREFERRED EMBODIMENT

Referring more particularly to the single FIGURE of drawing, there is illustrated a solid state sequencing switching system used in conjunction with transmitted sonar signals and hydrophone receivers such as may be used on shipboard. As shown herein sonar echo signals, picked up by hydrophones strategically placed about a ship or other vehicle to cover a spherical area, are individually passed through preamplifiers by way of a conductor means 11 to a plurality of bandpass filters illustrated in block form by 12. As illustrated on the drawing 48 inputs as from 48 hydrophones through preamplifier means are coupled to 48 bandpass filters, although 48 is used as an operative example herein but any number may be used to suit the circumstances. Each bandpass filter in the component 12 will pass 6.4 kilohertz (KHz) frequency ± 0.2 KHz. The 6.4 KHz frequency corresponds to the frequency of the transmitted sonar pulses but the bandpass filters are widened to the extent of ± 0.2 KHz to accommodate any doppler effects due to relative motion of the transmitter-receiver and the targets. The 48 outputs through the bandpass filters 12 are coupled by the cable means 13 to a like number of buffer and limiter elements in which the buffer devices, such as amplifiers, will isolate and provide a high impedance to the filter outputs and the limiters limit the 48 outputs on the output cable means 15 to ±5 volts where as much as 100 volts echo signals may be applied through input 11. The limiters thus protect the solid state circuitry downstream from the outputs 15. The 48 signal outputs 15 from the buffer and limiter circuit 14 are coupled to a solid state switch array 16 to which is applied 48 switch control signals by way of the input conductor means 17 provided in a manner hereinafter to be more fully described. The control inputs over the conductor means 17 select eight signal outputs to the right of a target signal and eight outputs to the left of a target signal thereby conducting 16 adjacent selected signals, centered on a predominate target signal, over the output conductor 18 to a demultiplexer circuit 19. Three coded control signal inputs 20 are applied to the demultiplexer 19 to direct the 16 signals to appropriate 128 points in a delay line 22 over a conductor means 21, providing a finer switching interval than the 48 position switch array 16. The manner in which the three coded control signals, coming by way of conductor means 20, are developed will be described hereinbelow. The coded control signals 20 are used for directing the 16 signal outputs 21 to the delay line to produce a beamforming single signal out of the end of the delay line and on through a passive bandpass filter 24 to an output 25 conducted by way of a shielded cable to the grid or other beam brightening means of a display device 26. The display device 26 includes a scope (cathode ray tube) 27 having horizontal and vertical deflection coils 28 and 29, respectively therein. The passive bandpass filter 24 passes 6.4 KHz ±1.6 KHz, being the frequency of the transmitted sonar pulse plus or minus a bandwidth for any doppler effect plus additional frequency components acquired in the scanning operation.

A 6.3 volt 60 Hz supply from the sonar transmitter/receiver power source is coupled by way of 31 to an oscillator 32 generating therefrom a 23,040 Hz frequency, as an example. This frequency is coupled by way of an output 33 to a counter circuit 34 having sufficient counters in which to produce a division of the input frequency by four on an output 35, a division of one, two, and four on the conductor means 20, and a division of eight on the output 36 resulting in a frequency of 2,880 Hz. The counter 34 also provides the outputs of its three most significant stages as three digital outputs to a digital-to-analog converter 37 (its three least significant bits at its input) by way of conductor means 38. The output 36 is coupled by a branch conductor to a 48 stage shift register 39, each stage providing an output on the conductor means 40 through switch driver circuits 41 to the input conductor means 17 of the switch array 16. Accordingly, the 2,880 Hz output 36, operative through the 48 stage shift register 39 and switch drivers 41, provides a 60 Hz operation of the switch array 16. The operation of the switch array 16 at a 60 Hz rate produces the beamforming in the delay lines 22 to produce a beam stepping through 48 steps in one revolution at the same 60 Hz rate.

The output 36 from the counter 34 is applied to a counter circuit 45 which is made to reset at every 48th count. A synchronous pulse is applied at terminal 46 to both the 48 stage shift register 39 and the counter 45 which sync pulse is applied from the sonar transmitter system to maintain synchronism between the transmitter and receiver circuits. The six outputs of counter 45 are applied by way of conductor means 47 along with the three outputs 38 of counter 34 to the digital-to-analog converter 37 which is a 9-bit solid state device that adds up the count to produce linear sawtooth voltages on its output 48 which are applied to the $x$-axis input of an external test oscilloscope whose $y$-axis can be connected to the output 25 of the bandpass filter 24 to provide a display of beam patterns or other tests for information or trouble shooting. The counter 45 has an input coupled from the 48 stage shift register 39 by way of conductor means 49 enabling the counter 45 to divide the 2,880 Hz by 48 to produce 47 outputs from the counters at a 60 Hz rate. The 47 outputs coupled by way of the cable means 50 are applied respectively to two read-only memory (ROM) circuits 51 and 52. The ROM circuit 51 is constructed to provide a sine function signal (sin $\alpha$) of eight outputs over the output conductor 53 while the ROM circuit 52 is constructed to produce a sine function (sin ($\alpha$ + 120)) shifted 120° in phase signals of eight outputs coupled by way of the output 54. The ROM circuits 51,52 output an 8-bit output number 00000000 to 11111111 (0 – 255$_{10}$) which is the sine function [1 + sin $\alpha$] or [1 + sin ($\alpha$ + 120°)] in 48 steps (0 – 47) for $\alpha$ from 0° – 360°. This establishes two digital output signals of 8-bits each that are sine functions of 120° separation. The 8-bit output 53 is coupled to a digital-to-analog converter circuit 55 while the 8-bit output 54 is coupled as an input to a digital-to-analog converter 56. A ramp waveform from the transmitter which starts at the time of transmission is the input at terminal 57 through a sweep range interface circuit 58 having one output 59 applied to the digital-to-analog converter 55 and a second output 60 coupled to the digital-to-analog converter 56 to multiply the normal outputs of both digital-to-analog converters to an increasing amplitude sine function. The circuit 58 provides the amplitude scaling and level shifting required. The output 61 of the digital-to-analog converter 55 and the output 62 of the digital-to-analog converter 56 are coupled through a resistor capacitor module 63 which adds the inputs 61 and 62 and inverts same to an output 64 which is an analog voltage signal representative of an angle 120° from either the sin $\alpha$ signal or the sin ($\alpha$ + 120) signal. The sin $\alpha$ signal is coupled by way of output 65 to a line driver circuit 66, the output 64 is coupled to a line driver 67, and the sin ($\alpha$ + 120) signal is coupled by way of output 68 to a line driver circuit 69. Line drivers 66 and 69 return analog voltages by way of conductor means 70 and 71 to the resistor-capacitor module 63 in the addition and inversion processing of the sin $\alpha$ and sin ($\alpha$ + 120°) signals to produce on outputs S1, S2, and S3 the synchro signals equiangularly spaced 120° apart. The sin $\alpha$ and sin ($\alpha$ + 120°) are added and inverted to form a third signal sin ($\alpha$ + 240°), thus eliminating a third sine function generation. The three signals S1, S2, and S3 each have filtering capacitors 72, 73, and 74 to filter the three outputs with respect to each other and these three outputs are connected in parallel to two Y-connected synchro transmitters 75 and 76 having transmitter outputs 77 and 78 coupled to the vertical (or $y$-axis) and horizontal (or $x$-axis) deflection coils 29 and 28, respectively, of the display scope 27. Since the digital-to-analog converters 55 and 56 are operated at a phase difference of 120° which is modified through the synchro system to two signals with 90° phase difference to the display tube 27, the display tube will produce a spiral scan with the beam traversing a circle on the tube every sixtieth of a second. Accordingly, as the spiral scan is drawn, any target signal produced by a beam formed thereby in the signal channel 11 – 25 will produce a bright spot on the display scope 27 at the range and in the angular direction of the target. The range is determined for the time interval of the spiral trace from its midpoint as it encircles the center to its outermost terminating point at which time it is returned to center by the linear sawtooth voltage conducted over 57.

The output 35 of 5,760 Hz is coupled through a switch 81 to an all channel test selector switching means 82,83, the 48 outputs of which are individually coupled to all 48 signal line channels in the cable 13. While switch 81 is shown in the conductor 35, as a practical construction an "off" position is incorporated in the selector switching means 82,83. The selector switch 83 enables switching in the tenths and selector switch 82 enables selection in the hundredths thereby providing a selection of a test signal to be applied to any one of the 48 signal line channels 1 through 48 to test the continuity thereof. Since the 5,760, Hz signal comes directly out of counter 34 at full TTL (Transistor-Transistor-Logic) logic levels it is of sufficient amplitude to overpower any hydrophone signal in the channel by brute force or jamming action. The appearance of this signal on the display oscilloscope 27 enables the operator to deduce the operation of all signal paths as normal or abnormal, and to further identify the offending component or circuit.

OPERATION

In the operation of the device let it be assumed that a single target appears at some angular relation and range from the transmitter and receiver position of the receiver shown and described herein and that this receiver operation is synchronized with the frequency bursts of the sonar transmitter to produce through the solid state signal channel 11 through 25 forming a beam at the center of 16 hydrophone signals on the output 25. The 16 hydrophones more nearly directed toward a target signal producing an echo will produce a voltage through the inputs 11 from which the delay lines form a beam on the output 25 constituting a target signal which is then applied to the grid or other brightness terminal of the display scope 27. Synchronized with the transmitter signals from which target echo signals will be returned is the transmitter's ramp generator output 57 suitably interfaced through the sweep ramp interface 58 which modulate the outputs of the D/A converters 55 and 56 which are filtered through 63 and are passed through line drivers 66, 67, and 69 which produce the three-phase output signals to the horizontal and vertical deflections which bias the beam of scope 27 from its center position to the periphery and back in a spiral pattern depicting range and bearing of said target. The target signal coming by way of conductor means 25 will thereby produce a bright spot on the scope 27 at the range out from the center of the tube and in the angular direction of the target thereby displaying the target position with respect to the sonar receiver. Accordingly, targets returning echoes from the sonar transmitted signal will be picked up and displayed by the solid state sequencing switching means to accurately display target position, i.e., direction and range from the receiver position.

While many modifications and changes may be readily apparent as by a more or less number of sonar signal inputs or by utilizing a different transmitter frequency, it is to be understood that we desire to be limited in the spirit of our invention only by the scope of the appended claims.

We claim:

1. A solid state high speed scanning compensator switch for sonar receivers comprising:
   a plurality of hydrophone signal inputs;
   circuit means coupled to said inputs capable of filtering, buffering and limiting said hydrophone signals individually and conducting same to an equal number of outputs therefrom;
   a solid state switch array having a plurality of control inputs and a plurality of signal outputs, said solid state switch array being coupled to said circuit means outputs;
   a demultiplexer having a plurality of signal inputs coupled respectively to said switch array signal outputs, having a three input control and a plurality of signal outputs;
   a delay line having a plurality of input taps coupled respectively to said plurality of demultiplexer outputs and having a single signal output being the sum of all delayed signals;
   a passive bandpass filter having an input coupled to said delay line output and having an output adapted to be coupled to a display device with a display system power system;
   an oscillator coupled through digital register circuits having outputs coupled to said control inputs of said switch array, having three outputs coupled to said three input control of said demultiplexer, and having outputs coupled through read only memory circuits and digital-to-analog converter circuits to produce analog voltage synchro reference signals, modulated by ramp function voltages and adapted for driving the beam of the display device, and test signal outputs coupled through test selector switch means to said circuit means to test continuity of simulated signals to the passive bandpass filter output whereby the oscillator provides proper digital frequencies on said digital register outputs to produce rapid scan switching of said switch array and demultiplexer and analog voltages to drive the synchro of the display device to produce target range and direction information of targets producing said hydrophone signals.

2. A solid state high speed scanning compensator switch as set forth in claim 1 wherein
   said circuit means includes a plurality of bandpass filters, each capable of passing hydrophone received echo signals of the bandwidth of the transmitted signals and possible doppler frequency, and includes a plurality of buffers and limiters for providing a high impedance load and for protecting the solid state circuitry from overvoltage.

3. A solid state high speed scanning compensator switch as set forth in claim 2 wherein
   said delay line plurality of input taps are at points dividing said delay line into sections to produce suitable microsecond delays for proper beamforming, the end of said delay line constituting said delay line output.

4. A solid state high speed scanning compensator switch as set forth in claim 3 wherein
   said oscillator is a phase-locked oscillator with the frequency and phase of the display system power supply and said digital register circuits are shift registers and digital counters to divide downward the frequency of said phase-locked oscillator.

5. A solid state high speed scanning compensator switch as set forth in claim 4 wherein
   said read only memory circuits include two, each of which have digital memory representative of the function of angles, but one hundred and twenty degrees apart, and said digital-to-analog converters utilize one for each read only memory output which produce on the outputs thereof analog voltages representative of the function of said angles 120° apart, said read only memory output including a resistor-capacitor module for summing and inverting said read only memory outputs to produce on its outputs three analog voltage signals at phase relation 120° apart providing signals adapted for driving a synchro of said display device.

6. A solid state high speed scanning compensator switch as set forth in claim 5 wherein
   said digital counters divide said oscillator frequency down to 60 Hz per second for said read only memory circuits.

7. A solid state high speed scanning compensator switch as set forth in claim 6 wherein
   said digital counters divide said oscillator frequency down to 2,880 Hz per second for said switch array, said 2,880 Hz frequency being applied to a 48 stage shift register, the output of which is through a switch driver to said control input of switch array.

8. A solid state high speed scanning compensator switch as set forth in claim 7 wherein
   said digital counters divide said oscillator frequency down to 5,760 Hz per second for coupling through said switch means to said circuit means at the inputs to said buffer and limiter circuit to apply jam test signals into said receiver.

* * * * *